US011797374B2

(12) United States Patent
Seck et al.

(10) Patent No.: US 11,797,374 B2
(45) Date of Patent: Oct. 24, 2023

(54) SYSTEMS AND METHODS FOR RECORDING MAJOR INCIDENT RESPONSE INFORMATION

(71) Applicant: Capital One Services, LLC, McLean, VA (US)

(72) Inventors: Mohamed Seck, McLean, VA (US); Louis Buell, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/670,919

(22) Filed: Feb. 14, 2022

(65) Prior Publication Data
US 2023/0259420 A1     Aug. 17, 2023

(51) Int. Cl.
*G06F 11/07*     (2006.01)

(52) U.S. Cl.
CPC ...... *G06F 11/0793* (2013.01); *G06F 11/0709* (2013.01)

(58) Field of Classification Search
CPC . G06F 11/0709; G06F 11/079; G06F 11/0793
See application file for complete search history.

(56) References Cited

U.S. PATENT DOCUMENTS 7,779,309 B2 * 8/2010 Pham ................. G06F 11/0769
714/48
9,406,023 B2   8/2016 Bogojeska et al.
10,535,002 B2  1/2020 Gupta et al.
10,877,946 B1  12/2020 Silva et al.
10,985,994 B1  4/2021 Mahadik et al.
11,003,518 B2  5/2021 Lopez et al.

(Continued)

FOREIGN PATENT DOCUMENTS

JP      2011 022955 A    2/2011

OTHER PUBLICATIONS

Posey, Brien; "What is a Server?"; TechTarget, WhatIs.com; retrieved from the Internet on Feb. 24, 2023.*

(Continued)

*Primary Examiner* — Joseph R Kudirka
(74) *Attorney, Agent, or Firm* — HUNTON ANDREWS KURTH LLP

(57) ABSTRACT

A system for recordation and retrieval of incident resolution action information is provided. A recordation system processor is provided with a recordation application configured to receive a response action initiation instruction identifying an action taken to resolve an incident on a target system. The processor determines one or more responsible responders each having a responder data processor that displays a responder dashboard. The processor transmits a recordation instruction to the responder data processor of each responsible responder. The recordation instruction includes an instruction to begin recording responder dashboard information. The recordation application is also configured to receive a response action termination instruction and to transmit a recordation termination instruction to the responder data processor of each responsible responder. A data storage unit is configured for receiving, from the responder data processors, real-time responder dashboard information recordings.

20 Claims, 10 Drawing Sheets

(56) References Cited

U.S. PATENT DOCUMENTS

| | | |
|---|---|---|
| 2007/0067773 A1 | 3/2007 | Hope et al. |
| 2008/0098109 A1 | 4/2008 | Faihe et al. |
| 2017/0123397 A1 | 5/2017 | Billi et al. |
| 2018/0307756 A1 | 10/2018 | Garay |
| 2019/0347282 A1 | 11/2019 | Cai et al. |
| 2020/0293946 A1 | 9/2020 | Sachan et al. |
| 2021/0397497 A1 | 12/2021 | Tiwari et al. |

OTHER PUBLICATIONS

International Search Report and the Written Opinion of the International Searching Authority issued in related PCT Application No. PCT/US2023/012992 dated Apr. 17, 2023, 13 pages.

\* cited by examiner

SYSTEMS AND METHODS FOR RECORDING MAJOR INCIDENT RESPONSE INFORMATION

FIELD OF DISCLOSURE

This disclosure relates generally to an automated system for incident resolution and, more particularly, to systems and methods for recording and storing resolution data.

The subject matter of this application is related to that of U.S. application Ser. Nos. 17/670,829, 17/670,855, 17/670,876, and 17/670,904, which are filed concurrently herewith, and the complete disclosures of all of which are incorporated herein by reference.

BACKGROUND

When an incident occurs in a technological practice area, a complex solution is often needed. To find a solution, several human and technological resources are needed to understand, analyze, and resolve the incident. The resolution process can take a long time, in some instances several hours or days. Even after arriving at a solution, it may not be clear to an outside observer how the solution was created.

As technological incidents become more common, incident-response groups are also becoming more common. A problem exists regarding these groups: it is often difficult to record and store each step taken by the incident-response group. Without an efficient way to track the actions of an incident response team, these teams must either rely on their own memories or coordinate with other team members. Either of these solutions requires time and effort to perform. Although it is possible to record every single action taken by every group member, this method of recordation is inefficient because it requires an observer to sift through a large amount of irrelevant data. For example, an incident may come to a resolution with the effort of one hundred responders. Though the responders may arrive at a resolution, the amount of communication between one hundred responders is unwieldy.

These and other deficiencies. Therefore, there is a need to provide systems and methods that overcome these deficiencies.

SUMMARY OF THE DISCLOSURE

Aspects of the disclosed embodiments include systems and methods for recordation and retrieval of incident resolution action information.

An exemplary embodiment of the present disclosure provides an automated system for recordation and retrieval of incident resolution action information. The system comprises a recordation data processing system having a recordation system data processor, a recordation system network interface in communication with a network, and a recordation system memory. The recordation system memory has stored therein a recordation application configured with instructions for the recordation system data processor to receive a response action initiation instruction that includes action information identifying a current action taken in furtherance of resolving an incident on a target data processing system, The recordation application is further configured with instructions for the processor to determine one or more responsible responders out of a group of responders. Each of the group of responders has a responder data processor in communication with one another and an incident response manager processing system over the network. The responder data processor is configured for display of a real-time responder dashboard and for video and audio communication. The recordation application is still further configured with instructions for the processor to transmit a recordation instruction to the responder data processor of each responsible responder. The recordation instruction includes an instruction to begin recording responder dashboard information, which includes at least a portion of the real-time responder dashboard display and video and audio communications of the responder data processing system. The recordation application is also configured with instructions to receive a response action termination instruction identifying the current action and to transmit a recordation termination instruction to the responder data processor of each responsible responder. The recordation termination instruction includes an instruction to stop recording responder dashboard information. The system for recordation and retrieval also comprises a data storage unit configured for receiving, from the responder data processors, real-time responder dashboard information recordings.

Another exemplary embodiment of the present disclosure provides an automated method for recordation and retrieval of incident resolution action information. The method comprises receiving, by a recordation data processing system over a network, a response action initiation notification from one of the set consisting of an incident response manager data processing system and an automated incident resolution system. The response action initiation notification includes action information identifying a current action taken in furtherance of resolving an incident on a target data processing system. The method further comprises determining, by the recordation data processing system, one or more responsible responders out of a group of responders. Each of the group of responders has a responder data processor in communication with one another and the incident response manager data processing system over the network. The responder data processor is configured for display of a real-time responder dashboard and for video and audio communication. The method still further comprises transmitting a recordation instruction to the responder data processor of each responsible responder. The recordation instruction includes an instruction to begin real-time recording of responder dashboard information and to transmit recorded responder dashboard information to a data storage unit. The responder dashboard information includes at least a portion of the real-time responder dashboard display and video and audio communications of the responder data processing system. The method also comprises receiving a response action termination instruction from one of the set consisting of an incident response manager data processing system and an automated incident resolution system. The response action termination instruction identifying the current action. The method also comprises transmitting a recordation termination instruction to the responder data processor of each responsible responder. The recordation termination instruction includes an instruction to stop real-time recording of the responder dashboard information.

Another exemplary embodiment of the present disclosure provides an automated system for facilitating incident resolution. The automated system comprises a data storage unit having stored therein incident resolution information for a plurality of system incidents, a plurality of responder data processing systems, and an action recordation processing system. Each of the plurality of responder data processing systems has a responder data processor, a network communication interface in communication with a network, a responder user interface, and a responder memory. The responder user interface is configured for presenting information to and receiving action information from a responding user, and for recording and displaying user telecommunication information. The responder memory has stored therein a dashboard application configured with instructions for the responder data processor to receive incident response information from at least one of the set consisting of the responding user, other responder data processing systems, an incident response management processing system, and an incident resolution data processing system. The application is further configured with instructions to construct and continually update a set of responder dashboard information including at least a portion of the received incident response information and to display at least a portion of the responder dashboard information, to the responding user via the responder user interface. The application is still further configured with instructions to receive a recordation instruction to begin recording at least a portion of the responder dashboard information, to receive a recordation termination instruction to stop recording the at least a portion of the responder dashboard information, and to transmit, via the network to the data storage unit, the recorded responder dashboard information. The action recordation processing system has a recordation system data processor, a recordation system network interface in communication with the network, and a recordation system memory. The recordation system memory has stored therein a recordation application configured with instructions for the recordation data processor to receive action information from at least one of the set consisting of the incident response management processing system and the incident resolution data processing system and to determine whether the action information indicates a critical action is being initiated or has been resolved. The application is also configured with instructions to, responsive to a determination that the critical action is being initiated, determine one or more responsible responders associated with the critical action and transmit a recordation instruction to the responder data processing system associated with each responsible responder. The recordation instruction includes an instruction to begin recording responder dashboard information. The application is also configured with instructions to, responsive to a determination that the current action has been resolved, transmit a recordation termination instruction to the responder data processor of each responsible responder. The recordation termination instruction includes an instruction to stop recording responder dashboard information.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

A system can experience an incident that requires an entire team to diagnose, fix, and learn from the incident. In order to facilitate problem-solving, team members will often communicate with each other to resolve the incident. For example, one team member may need to share visual information with another team member. As another example, one team member may discover the source of the incident and desire to show the source to another team member. Several of these instances arise during the incident resolution process.

Due to the high amount of communication shared between team members, it is often difficult for teams to understand how exactly a resolution was reached. Different team members may have contributed in some small part to the solution, but it is difficult to track the exact steps taken to arrive a solution. Therefore, it is often time-consuming for the team to learn from the resolution process, and they may need to re-learn steps that they have already taken for past incidents. This results in wasted time, slower resolution, and greater frustrations among team members. Although it is possible to record every single step taken by every single team member, the amount of data required for this plan would be unwieldy and difficult to store. Furthermore, looking at such a recording would be inefficient and time-consuming.

Embodiments of the present disclosure provide an improvement to the resolution process by offering a figurative black-box that records communications and contemporaneous system information for future review. Analysis of the black-box recordings provides a better understanding of the process and the steps taken to resolve an incident. The present disclosure provides a system and methods for automatically recording relevant information and responder communications, comparing the recorded information to historical data, and storing the information that is relevant to the immediate solution.

Figure 1:
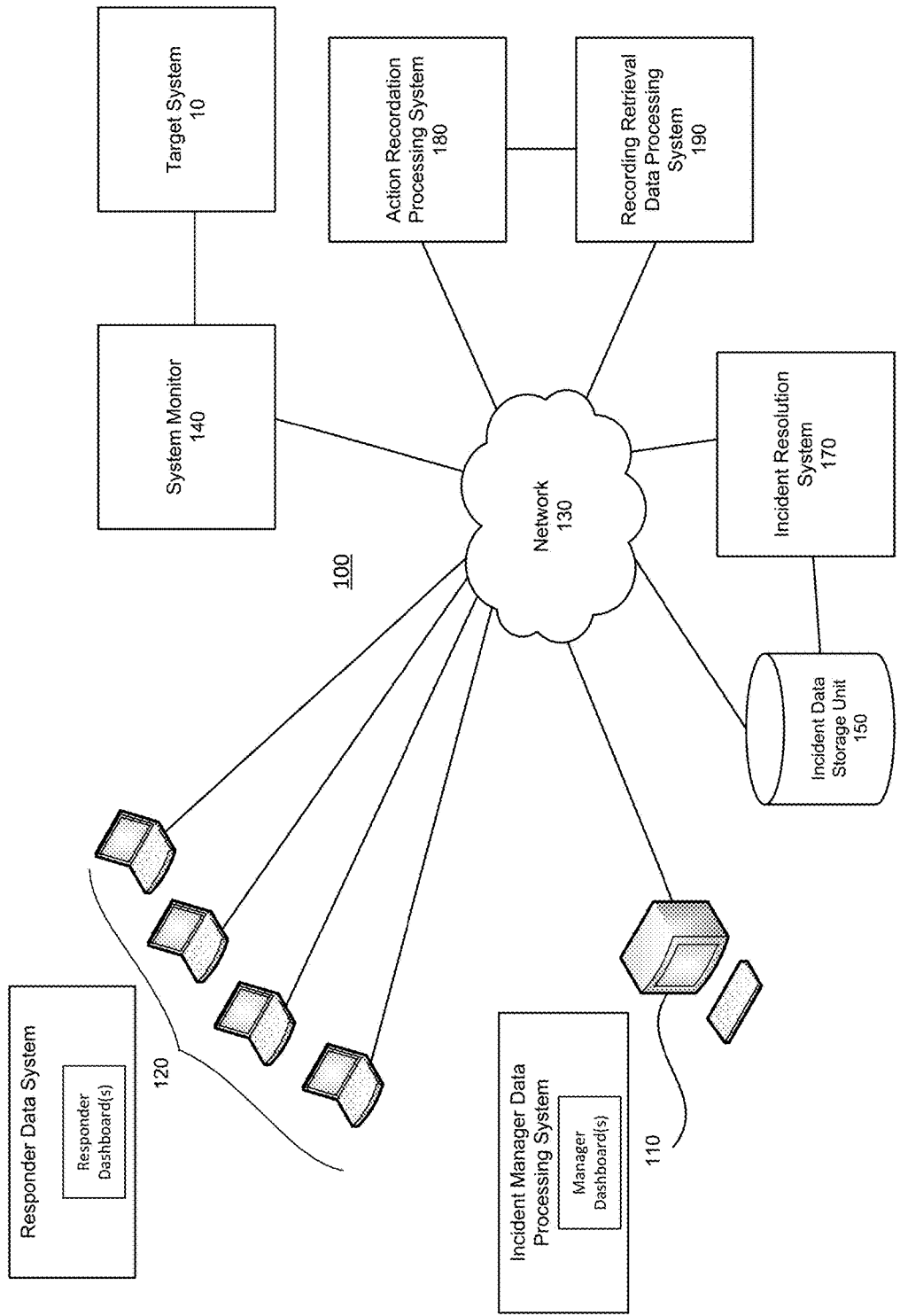
FIG. 1 is a diagram illustrating a system of recordation and retrieval of incident resolution action information according to an embodiment of the invention.

FIG. 1 illustrates an incident information recordation system 100 for recording information relating to an incident occurring on a target system 10 according to an example embodiment. The system 100 can include an incident manager data processing system 110 and one or more incident responder data processing systems 120 in communication with one another via a network 130. As will be discussed, the incident manager data processor 110 may be configured for receiving information from and providing information to an incident manager. The responder data processing systems 120 may each be configured for receiving information from and providing information to an individual incident resolution team member. All of these systems may be connected to one another via the network 130 through the use of collaboration software. Any or all of the incident manager system 110 and the responder systems 120 may also be configured to initiate and/or monitor the results of actions in furtherance of resolving a system incident.

The responder data processing systems 120 may each be or include any network-enabled data processing and/or communication device including, but not limited to a smartphone, a laptop, a desktop computer, and a tablet. It is understood that these are non-limiting examples and that the responder data processing systems 120 may include other devices or a combination thereof. Each responder data processing systems 120 comprises a processor, memory, a user interface, and a communication interface. The memory of a responder data processing system 120 may also have an incident resolution facilitation application stored therein, but with lesser functionality than is provided to the manager system 110.

The recordation system 100 may also include or may be in communication with a system monitor 140 configured for monitoring and providing information on operations of a target system or object 10. The system monitor 140 is, in particular, configured to determine whether the target system or target object 10 has experienced or is experiencing a service failure or other incident. As used herein, a system incident may be any instance where the monitored system 10 is in a measurably undesirable state (e.g., a system or component has crashed or suffered a hardware failure, an application has a memory leak or a performance issue, etc.). The system monitor 140 may be further configured to obtain diagnostic and other operating information for the monitored system 10 and communicate to appropriate recipient systems via the network 130.

It will be understood that the recordation system 100 may be connected to any number of systems 10 for purposes of monitoring performance thereof and resolving incidents therein. This may be accomplished using a plurality of system monitors 140 or using a single monitoring system 140 in communication with multiple systems 10.

The recordation system 100 includes an incident resolution system 170 that is configured for facilitating the resolution of an incident occurring on the monitored system 10. The incident resolution system 170 is configured for receiving information from any or all of the incident manager system 110, the responder systems 120 and the system monitor 140 via the network 130. The incident resolution system 170 may include or be in communication with an incident information data storage unit 150 that has stored therein historical information on previous system incidents and the actions taken in furtherance of resolution of such incidents. The incident resolution system 170 may receive system status information from the system monitor 140 and action status information from any or all of the responder systems 120. The system 170 may receive action instructions from the manager data processing system 110 and assess and/or transmit them to individual responder systems 120.

The recordation system 100 also includes an action recordation processing system 180 configured for communication with the incident resolution system 170, the incident manager data processing system 110 and the incident responder data processing systems 120 over the network 130. As will be discussed in more detail hereafter, the action recordation data processing system 180 may record in the data storage unit 150 system status information, communications between data processing systems 110, 120, and other information displayed to and used by incident resolution team members. In some embodiments, the incident recordation system 100 may also include a recording retrieval data processing system 190 configured to facilitate retrieval and analysis of previously recorded incident information.

Figure 2:
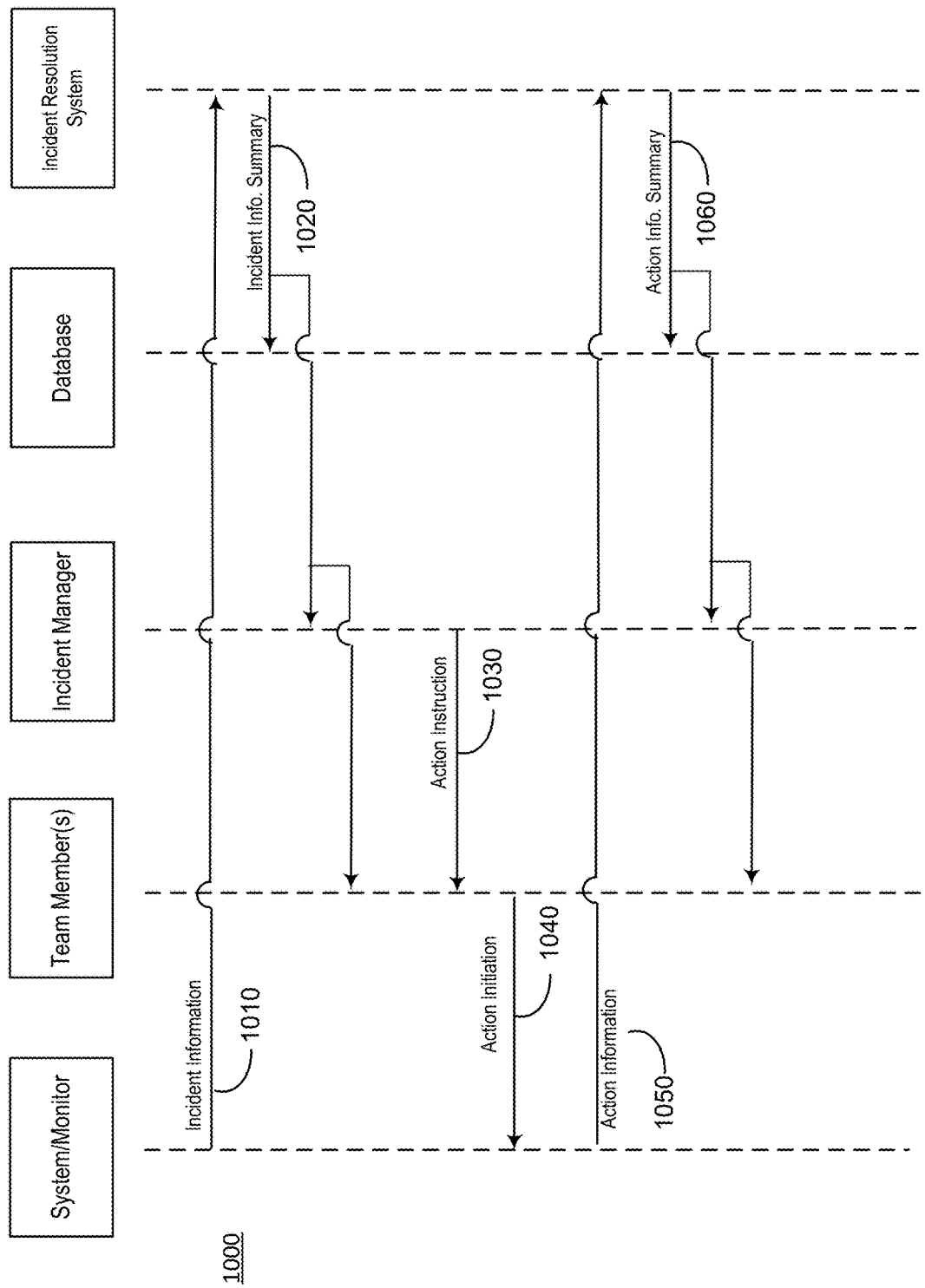
FIG. 2 is a sequence diagram illustrating the processing of action information in an incident resolution system usable in conjunction with the invention.

The sequence diagram of FIG. 2 illustrates a typical operation scenario for distributing information and implementing a critical action during a team response to an incident occurring on a target system. In the exemplary sequence 2000, a failure or unacceptable performance loss in the target system 10 has been identified by the system monitor 140. At 1010, incident information obtained by the system monitor 140 from the target system 10 is sent to the incident resolution system 170. The incident information may include information regarding various operating parameters for the system 10 and/or specific parameters associated with the identified failure or performance loss. The information may include current operating parameters and/or past parameters and associated times at intervals surrounding the start of the incident. The incident resolution system 170 may assemble the incident information into a usable form and, at 1020, send it to the incident manager and, in some embodiments, one or more team members. The incident resolution system 170 may also establish an incident record in the data storage unit 150 that includes some or all of the incident information. It will be understood that actions 1010 and 1020 may be repeated on a continuous, periodic, or as-needed basis throughout the incident resolution process to assure that all involved personnel have access to current incident status.

At 1030, the incident manager issues an instruction to one or more responders to initiate an action in furtherance of incident resolution. 10 It will be understood that actions in furtherance of resolution may have widely different degrees of importance and that some may be deemed critical actions that may be identified, tracked and controlled. Critical actions may be common-place actions such as those necessary to establish the bridge call or to assure that necessary personnel are contacted. Critical actions may also include more significant actions taken to "fix the problem" (e.g., initiation of a reboot of a particular system component). Certain action types may be predetermined to be critical actions while others may be identified as critical actions by the incident manager. In some embodiments, critical actions may be identified based on analysis of prior incident history.

While the diagram in FIG. 2 shows the action instruction as being sent to one or more responders for execution or initiation, there may be instances where the action instruction is directed to other personnel or system components for direct action. For example, an action instruction may be sent by the incident manager directly to the resolution facilitation server. Such an action could be, for example, to request information or a predicted result for a proposed action. In some cases, the action may simply be to record the occurrence of a particular event (e.g., a critical event) and/or to identify and track a critical action.

At 1040, the one or more responders may initiate the requested action, e.g., by implementing a command to the target system or to the system monitor. At 1050, the system monitor 140 sends action information to the incident resolution system. This information may include information on the initiation of a specific action and/or an update to the status and/or operating parameters of the target system. The incident resolution system 170 may assemble and analyze the received information and, at 1060, may send some or all of the information (or a summary) to the incident manager and to one or more of the responders for display via an incident resolution dashboard. The incident dashboard may be configured to provide a snapshot of relevant information to the incident responders, including system status, team communications and on-going actions. Although not shown in FIG. 2, the incident resolution system 170 may receive subsequent updates to the system status information which the system 170 may evaluate to assess the effects of the initiated action. In each case, the incident resolution system 170 may pass the information to responder systems 120 for display and may store the information in the incident information database. In some embodiments, the incident resolution system 170 may also update its action recommendation model based on the action result information.

Figure 3:
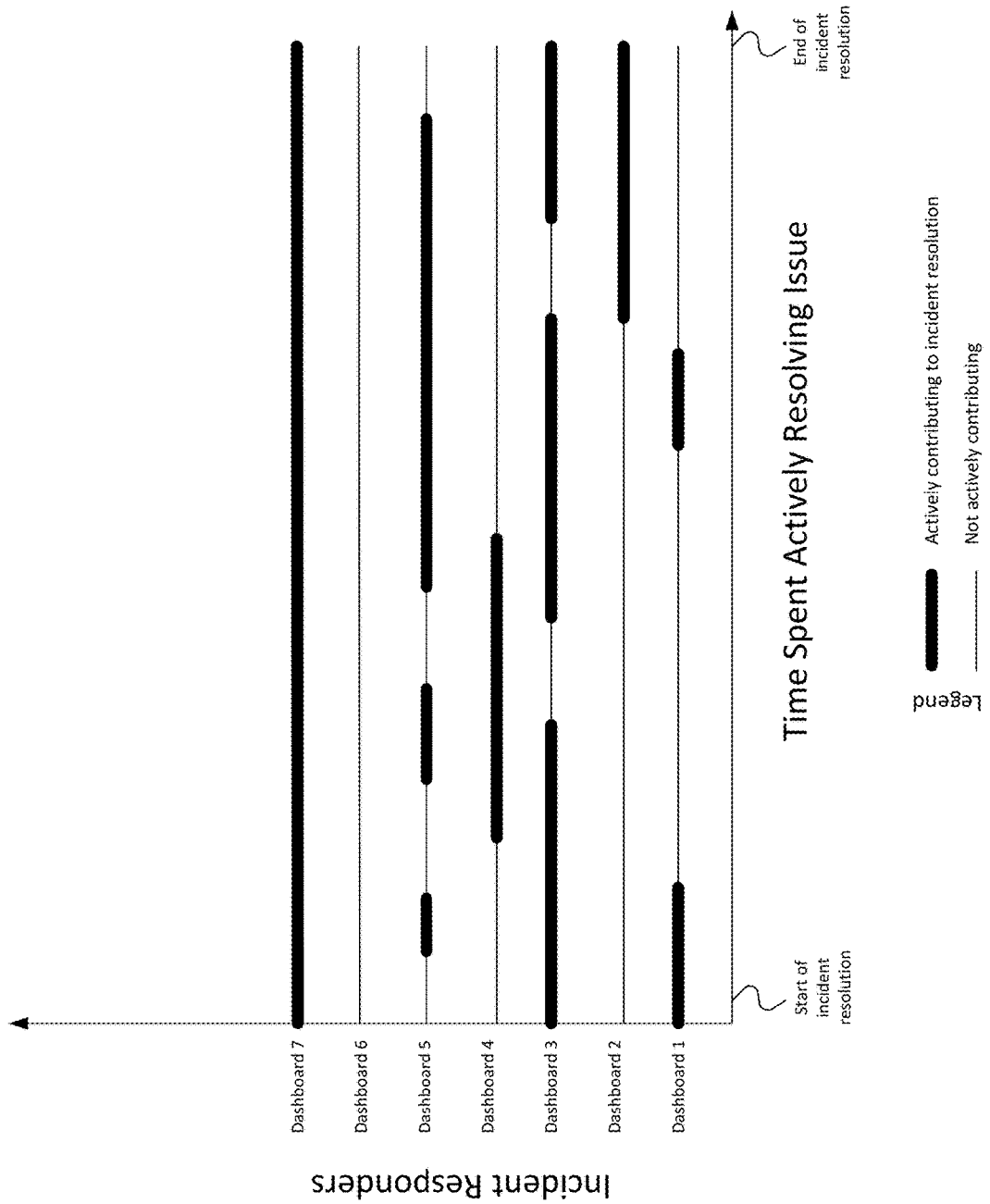
FIG. 3 is a diagram illustrating responder activity during an incident response action.

During the process of resolving an incident, the scenario depicted in FIG. 2 may be repeated many times, resulting in a great deal of information being stored. In assessing the resolution process after the incident is resolved, it is typically highly desirable to be able to see the information available to the various team members at critical times. One way to do this is to record, in addition to system status, action, and other incident resolution information, the time-varying dashboard view of each responder. FIG. 3 illustrates the problem with this type of recordation approach.

As illustrated in FIG. 3, a typical incident resolution team may comprise a number of responders, each being associated with a responder data processing system and a responder dashboard. The example in FIG. 3 names seven such dashboards, although it is understood that an incident resolution system may include any number of responders and dashboards. The diagram depicts the activity of each responder from the beginning of the incident resolution to the end of the incident resolution. In this span of time, each responder can be either actively contributing (i.e., involved in an action in furtherance of resolution) or not actively contributing to the incident's resolution. When a responder/dashboard is actively contributing, its activity is denoted by a bolded line.

Because different responders have different responsibilities, the amount of time each responder actively contributes to incident resolution can vary. For example, a particularly relevant responder such as dashboard 7 may be actively contributing for the entire time span. Other dashboards such as dashboard 5 may be actively contributing for only some of the time span.

This diagram illustrates a deficiency with the "record all" approach to dashboard documentation. In order to analyze the resolution process for a particular incident, one must study the actions undertaken by the incident responders. But the amount of information flowing between responders can be large or too varied in relevancy. For example, the total information communicated by all seven dashboards in FIG. 3 may be extremely large. Moreover, much of the information can be irrelevant or duplicative. For example, dashboard 1 contains only some relevant information because it was actively contributing towards the incident's resolution for a couple of short spans. Therefore, studying the entirety of dashboard 1's time span would be time consuming and largely inefficient.

Figure 4:
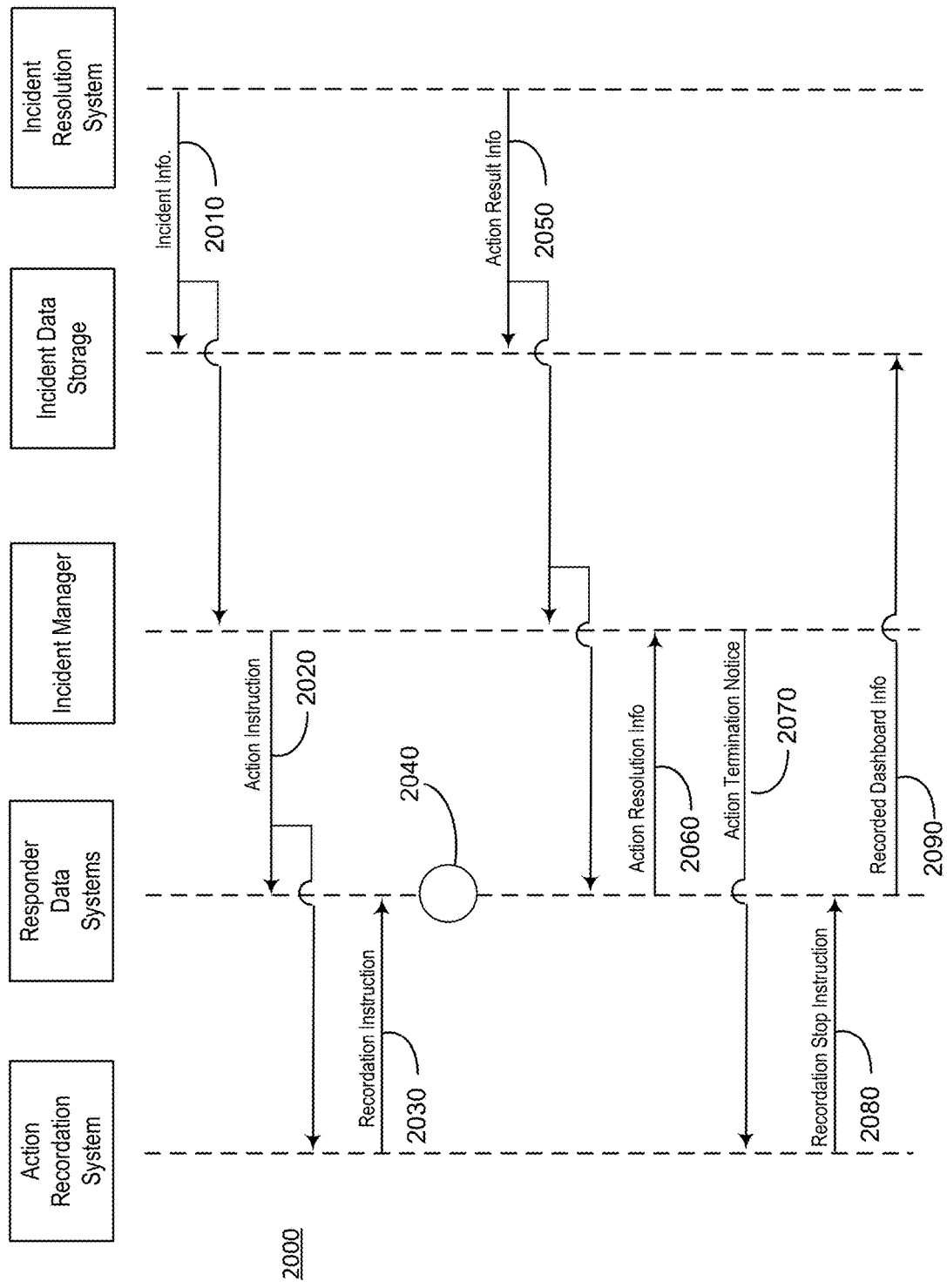
FIG. 4 is a sequence diagram illustrating a process for recording incident resolution action information according to an embodiment of the invention.

The methods of the present invention provide an automated approach that provides for recording the dashboard display of relevant responders. FIG. 4 is a sequence diagram illustrating an exemplary sequence 2000 according to an embodiment of the invention. The sequence 2000 applies to a scenario in which an incident has occurred on a target system (e.g., target system 10 of FIG. 1) and an incident resolution effort has been initiated. The sequence 2000 may begin with step 2010 in which the incident resolution system 170 sends incident information to the incident manager and to the incident data storage module. This information may be or include initial or updated target system status information that can be used by the incident manager to make decisions regarding actions to be taken to resolve the incident. The incident information can include general information about the incident, including but not limited to time, place, type, amount, identity, damage, or other limitation. The incident information may include information regarding various operating parameters for the system 10 and/or specific parameters associated with the identified failure or performance loss. The information may include current operating parameters and/or past parameters and associated times at intervals surrounding the start of the incident. At 2020, the incident manager determines an action to be taken and sends an action instruction to the data processing systems of one or more responders or potential responders and to the action recordation system. The action recordation system may then make a determination as to the actual or likely responders who will be responsible for carrying out the action. This may be all or a subset of one or more potential responders receiving the action instruction from the incident manager. After making this determination, the action recordation system transmits a recordation instruction to the data processing systems of only the action responsible responders. In response to the recordation instruction, the responsible responder data systems may begin recording incident response dashboard information.

At 2040, the responsible responders implement the action instruction. This could involve, for example, making changes to target system hardware, software, or operating parameters. Various aspects of such measures may be recorded by the responder system, including communications, system information obtained and displayed to the responders, and other information presented to the responsible responder(s) via the incident dashboard.

At 2050, the incident resolution system may transmit action result information to the incident manager and responder data systems. This information may include system status information or any other information indicating results of the action or actions taken by the action responsible responders. The responsible responders may, at 2060, send action resolution information to the incident manager, who may then make a determination as to whether the instructed action has been completed and all effects resolved. The incident manager processing system may then send an action termination notification to the action recordation system at 2070. At 2080, the action recordation system sends a recordation stop instruction to the data systems of the action responsible responders. In response, the responder data processing systems may stop recording dashboard information. The responder data processing systems may then, at 2090, transmit the recorded dashboard information to the incident data storage unit.

In some embodiments of the invention, instead of a single transmission of all recorded dashboard information, the responder data processing systems may periodically or continuously transmit dashboard information to the incident data storage while the action is being taken and resolved.

The exemplary scenario shown in FIG. 4 may be repeated many times through the course of an incident resolution effort. Further, many actions involving the same or different combinations of responders may overlap with one another. The methods of the invention assure that a complete record is provided of the information available to and the actions taken by the responders contributing to the resolution effort without cluttering the record with information relating to other responders or potential responders.

Individual components and subsystems of the recordation system 100 will now be discussed in more detail. As noted above, the incident resolution system 170 is configured for receiving information from and disseminating information to the various components of the system 100. The incident resolution system 170 may also be configured for recommending actions to be taken in furtherance of resolving an incident. The incident resolution system 170 may be or include a resolution facilitation server such as those described in U.S. patent application Ser. Nos. 17/670,829, 17/670,855, and 17/670,876, respectively filed concurrently herewith.

The incident resolution system 170 may include an action recommendation processing system configured to use a model based on historical information from the data storage unit 150 to determine resolution action recommendations and to provide these recommendation to the incident manager system 110. The action recommendation processing system may further be configured to use subsequent actions and action results to update and refine the action recommendation model. The incident resolution system 170 may, in addition to or instead of the action recommendation processing system, include a resolution estimation processing system configured to use the historical information from the data storage unit 150 to estimate the time required to complete individual actions. The resolution estimation processing system may further be configured to estimate an expected overall time to resolve the incident.

The data storage unit 150 may be one or more systems, servers, or modules configured for data storage and may have stored therein searchable historical data records for enterprise system incident and incident resolution efforts. These data records may include information for incidents occurring on the target system 10 and/or other incident-stricken systems. For each incident, the recorded information may include, without limitation, time-based information on the nature and characteristics of the incident, the state of the stricken system, resources available and resources used to resolve the incident, critical actions taken in furtherance of incident resolution and information on the results of each such action, and external conditions affecting incident causes or resolution. In particular embodiments, critical actions may be categorized according to action type, resources required, relative effectiveness, etc. In some embodiments, common critical actions may be pre-defined or fall into pre-defined categories. Stored incident information may also include audio and/or video recordings of communications between resolution team members.

The data storage unit 150 may include records for all critical actions taken in previous incident resolution events. The stored information for each action includes the characteristics of the action including the specific technological and human resources used to implement the action. Action characteristics may also include the specific steps taken and the timing of each. The stored action information may include responder data processor dashboard information for responders involved in implementing and resolving the action.

The system monitor 140 may be any combination of a network-enabled processor and software configured to monitor the target system 10 or a particular software application operating thereon to determine operating status and identify and track the occurrence of an incident thereon or associated therewith. The system monitor 140 may track operating parameters and at regular intervals and/or upon command provide incident information to the incident resolution system 170 and/or other system components/actors.

The network 130 may be or include a wireless network, a wired network or any combination of wireless network and wired network. The network 130 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 130 may include, without limitation, telephone lines, fiber optics, IEEE Ethernet 902.3, a wide area network (WAN), a wireless personal area network, a local area network (LAN), or a global network such as the Internet. In addition, the network 130 may support an Internet network, a wireless communication network, a cellular network, or the like, or any combination thereof. The network 130 may further include one network, or any number of the exemplary types of networks mentioned above, operating as a stand-alone network or in cooperation with each other. The network 130 may utilize one or more protocols of one or more network elements to which they are communicatively coupled. The network 130 may translate to or from other protocols to one or more protocols of network devices. Although the network 130 is depicted as a single network, it should be appreciated that according to one or more examples, the network 130 may comprise a plurality of interconnected networks, such as, for example, the Internet, a service provider's network, a cable television network, corporate networks, such as credit card association networks, and home networks.

Figure 5:
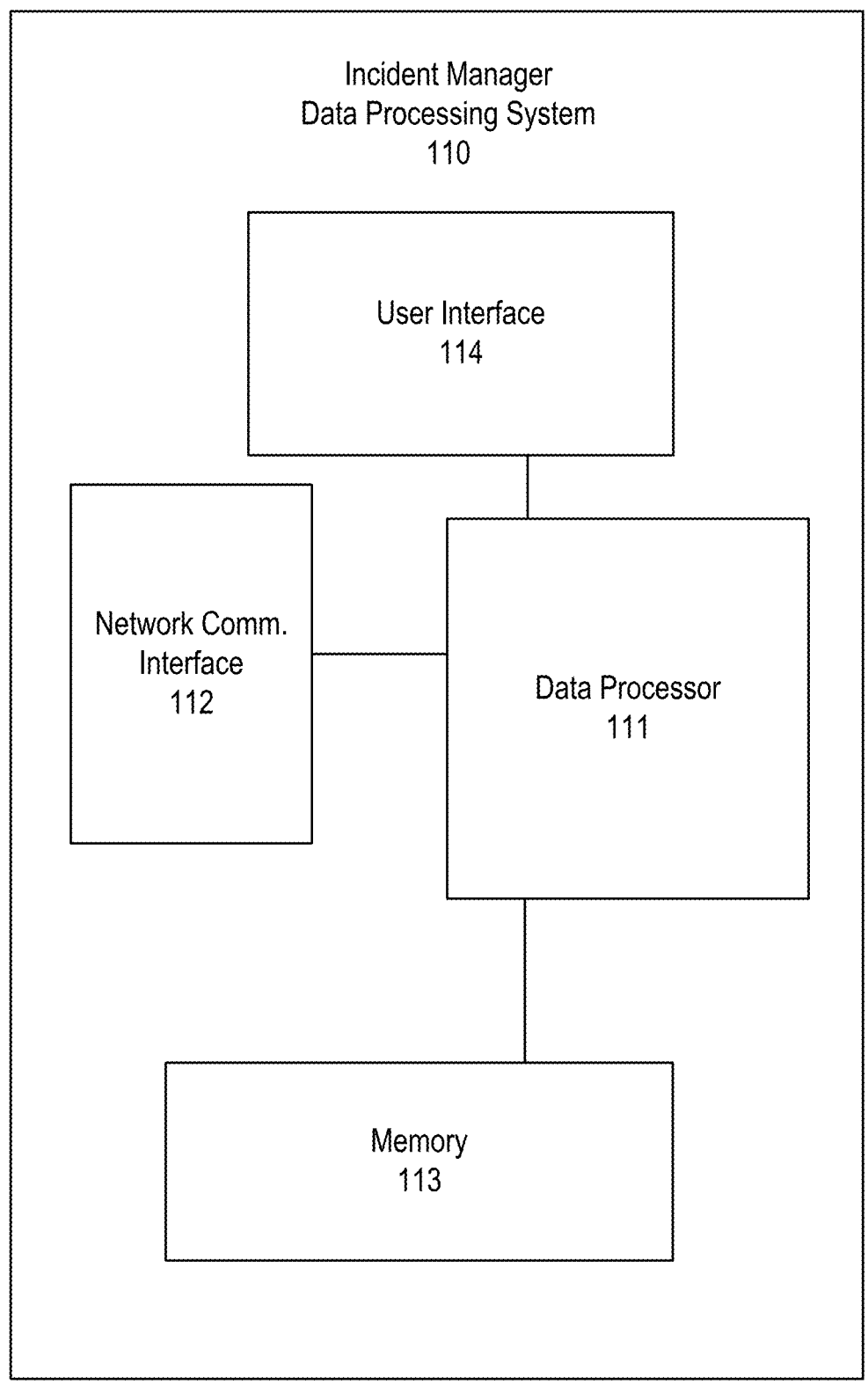
FIG. 5 is a schematic illustration of an incident manager data processing system according to an embodiment of the invention.

With reference to FIG. 5, the incident manager data processing system 110 may be or include any network-enabled data processing and/or communication device including, but not limited to a smartphone, a laptop, a desktop computer, and a tablet. In particular embodiments, the manager data processing system 110 includes an on-board data processor 111 in communication with a memory module 113, a user interface 114, and a communication interface 112. In some embodiments, the manager data processing system 110 may include an image capturing device (e.g., a digital camera) and/or an audio input/recording device. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 may include one or more user input mechanisms, which can be any device for entering information and instructions into the manager data processing system 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays. In some embodiments, the user interface 114 may be configured to capture audio-visual communications between a user of the system 110 and users of other network-connected data processing systems (e.g., responder data processing systems 120).

The user interface 114 is configured to establish and support wired or wireless data communication capability for connecting the incident manager data processing system 110 to the network 130, or other communication network. The user interface 114 can also be configured to support communication with a short-range wireless communication interface, such as near field communication (NFC), radio-frequency identification, and Bluetooth.

In embodiments of the invention, the memory 113 may have stored therein one or more applications usable by the data processor 111 to conduct and/or monitor exchanges with the incident resolution system 170 and responder data processing systems 120. The memory may also have stored therein a dashboard application configured for assembling, organizing and displaying on a display of the user interface 114 incident related information and communications. In an exemplary embodiment, the dashboard display could include one or more windows, each displaying a different type of incident-related information. Different information windows could be included, for example, for overall incident description and status, an incident resolution timeline, communications to and from the incident resolution system, communications to and from individual responders or responder groups, team communications transcripts, target system status information, and information on internal and external effects of the incident. The dashboard application may be configured to display multiple information windows and/or to toggle various windows on and off.

The memory 113 may further have stored therein an incident information recordation application configured for recording visual display and/or video and audio communications presented to and by the user of the manager data processing system 110. In particular, the recordation application may be configured to record the time-varying incident dashboard display generated by the dashboard application. The recording of the dashboard may include only the time-varying information actually displayed to the user or may include all of the information windows, whether displayed or not. All the recordings made by the recordation application may include time information to allow synchronization with time-varying system and other incident-related information.

The recordation application may be configured to determine when recordation of incident information should be initiated and terminated or to receive initiation and termination instructions from a user or other system. In typical instances, however, the application may begin recording manager data processor information upon initiation of an incident resolution effort, record continuously through the course of the effort, and stop recording upon resolution of the incident. In certain embodiments, the recordation application may be configured to receive recordation instructions from the action recordation processing system 180. Such instructions may include an instruction to start or stop recording incident information. In some embodiments, the instructions may identify particular information (e.g., display information, communications, video, audio, etc.) that should be included in the recordation or omitted from the recordation. The incident recordation application may be configured to periodically transmit recorded information to the incident data storage unit 150 throughout the incident resolution effort. Alternatively, some or all of the recorded data may be stored in the memory 113 or other data storage space until after the incident is resolved, whereupon such data would be transmitted to the incident data storage unit 150. In all cases, the recorded data may be transmitted along with an identifier for the manager data processing system 110.

Like the incident manager data processing system 110, the responder data processing systems 120 may be or include any network-enabled data processing and/or communication device including, but not limited to a smartphone, a laptop, a desktop computer, and a tablet. The responder data processing systems 120 would also have a data processor, memory, a user interface and a communication interface. The memory of the responder data processing systems 120 may also have an incident resolution facilitation application stored therein, but with lesser functionality than is provided to the manager system 110. The responder system application may, for example, be configured for receiving and displaying information received from the incident resolution system 170 and for tracking communications and actions involving a particular responder system 120. The memory of the responder systems 120 may also have stored therein a dashboard application configured for assembling, organizing and displaying on a display of the user interface 114 incident related information and communications. In an exemplary embodiment, the dashboard display could include one or more windows, each displaying a different type of incident-related information. Different information windows could be included, for example, for overall incident description and status, an incident resolution timeline, communications to and from the incident resolution system, communications to and from individual responders or responder groups, team communications transcripts, target system status information, and information on internal and external effects of the incident. The dashboard application may be configured to display multiple information windows and/or to toggle various windows on and off.

The memory of the responder data processing systems 120 may have stored therein an incident information recordation application. The application may be similar to that described above for the manager data processing system 110, but would typically provide for less (or no) control over the recording by the team member users. The incident information recordation application may be configured for recording visual display and/or video and audio communications presented to and by the user of the data processing system 120. All such recordings may include time information to allow synchronization with time-varying system and other incident-related information. The recordation application may be configured, in particular, to record the time-varying incident dashboard display generated by the dashboard application. The recording of the dashboard may include only the time-varying information actually displayed to the user or may include all of the information windows, whether displayed or not. All the recordings made by the recordation application may include time information to allow synchronization with time-varying system and other incident-related information.

In typical embodiments, the recordation application is configured to receive recording instructions from the action recordation processing system 180. Such instructions may include an instruction to start or stop recording incident information. In some embodiments, the instructions may identify particular information (e.g., display information, communications, video, audio, etc.) that should be included in the recordation or omitted from the recordation. The incident recordation application may be configured to periodically transmit recorded information to the incident data storage unit 150 throughout the incident resolution effort. Alternatively, some or all of the recorded data may be stored in the memory 113 or other data storage space until after the incident is resolved, whereupon such data would be transmitted to the incident data storage unit 150. In some embodiments, the application may be configured to transmit recorded data only upon receiving instructions from the action recordation processing system to do so. In other embodiments, instructions may be received regarding the timing of periodic or one-time transmission of recorded information. In all embodiments, the recorded information may be transmitted along with an identifier for the manager data processing system 110.

Figure 6:
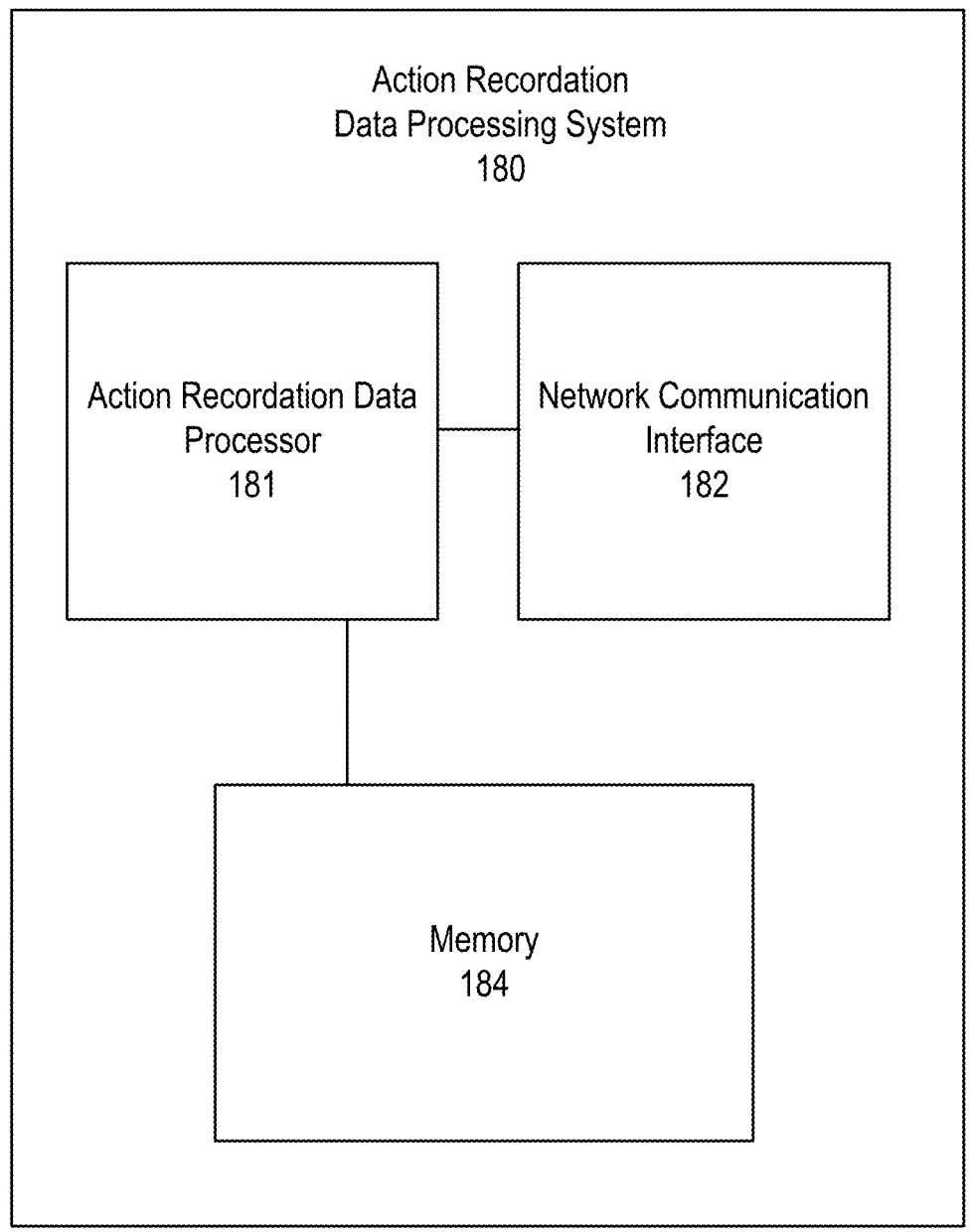
FIG. 6 is a schematic illustration of an action recordation data processing system according to an embodiment of the invention.

The action recordation data processing system 180 may be or include one or more network-enabled automated data processors configured for communication with each other and with other components of the incident recordation system 100 via the network 130 or other networks. In general, the action recordation data processing system is configured to control the recordation of incident response information by the individual responder data processing systems 120 and, in some embodiments, that management data processing system 110. With reference to FIG. 6, the action recordation data processing system 180 may include a network communication interface 182 in communication with a data processor 181. The network communication interface 182 is configured for connection to and communication over the network 130. In particular the communication interface 182 is configured for communication between the data processor 181 and the various other processing systems of the recordation system 100 and for receiving environment and other information from sources outside the system 100. The network interface 182 can include a network interface card (NIC), Standard Ethernet Version 2 (en), IEEE 802.3 (et), Token-ring (tr), Serial Line Internet Protocol (SLIP), Loopback (lo), FDDI., Serial Optical (so), Point-to-Point Protocol (PPP), or Virtual IP Address (vi).

The data processor 181 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The action recordation system 180 also includes a memory module 184.

The action recordation data processor 181 and the memory 184 may be collectively configured to receive general incident information from one or more of the incident resolution system 170, the incident data storage unit 150, the incident manager data processing system 110, and the responder data processing systems 120. The data processor 181 may also be configured to receive information regarding a particular response action taken in furtherance of resolution of the incident. This may include indications of action initiation, action termination, and information regarding the responding incident resolution team members ("responders"). In some embodiments, the information may be a response action initiation instruction that identifies and/or provides information on an action being initiated. In some embodiments, the action information may not explicitly state whether the action is a new action or is a previously initiated action. In such embodiments, the data processor 181 may be configured to determine from the action information that an action is newly initiated or that a previous action has been resolved.

In some embodiments, upon initiation of a new action, information identifying the responders responsible for the action may be provided to the recordation processor 181. In other embodiments, the data processor 181 may be configured to determine, from a group of all possible responders, a set of responders expected to be responsible for the action. This determination may be made based on a combination of personnel availability, responder background information, and previous incident information. To assist in the determination, the data processor 181 may obtain from sources within and outside the system 100, environment and other pertinent information regarding the resources available to carry out a desired action. In particular, the action recordation data processor 181 may receive information regarding the responders and/or potential responders for a particular incident. Such information could be, for example, roster information identifying all potential team members, information on whether certain personnel are unavailable (e.g., due to illness, vacation, etc.), and up-to-date information on the skill sets, background, and training of potential responders. The recordation processor 181 may also be configured to obtain information from the incident data storage unit 150 regarding the participation of responders in carrying out similar actions during prior incidents. The action recordation processor 181 may be configured to construct, using the available personnel, environment, and historical information, a list of responsible responders expected to be involved in carrying out the specified action. In certain embodiments, the recordation processor 181 may make use of a machine learning model to determine an expected set of responsible responders. Such a model may be trained, at least in part, based on historical information for actions taken to resolve previous incidents. Feedback may be provided to the model based on actual responder data, which can be compared to the expected data generated using the model and current incident information.

The recordation processor 181 may be configured to, upon determination of a set of responsible responders for a newly initiated action, transmit recordation instructions to the responder data processing system 120 of each responsible responder. Such instructions may include an instruction to start recording incident dashboard and/or other information presented to or provided by the responder during the implementation of the action. In some embodiments, the instructions may identify particular information (e.g., display information, communications, video, audio, etc.) that should be included in the recordation or omitted from the recordation. The instructions may also include a time or frequency at which the responder data processing systems 120 should transmit recorded information to the data storage unit 150.

The recordation processor 181 may be further configured to receive an indication that an action has been resolved or otherwise terminated. Upon receiving such an indication, the recordation processor may transmit to each of the responder data processing systems 120 of the responsible responders, instructions to terminate recordation. In some embodiments, the recordation processor 181 may be configured to determine whether any of the responsible responders are also responsible for other actions. In instances where such is the case, the responder data processing system 120 may withhold the termination instruction so that recordation continues on that responder system 120.

Figure 7:
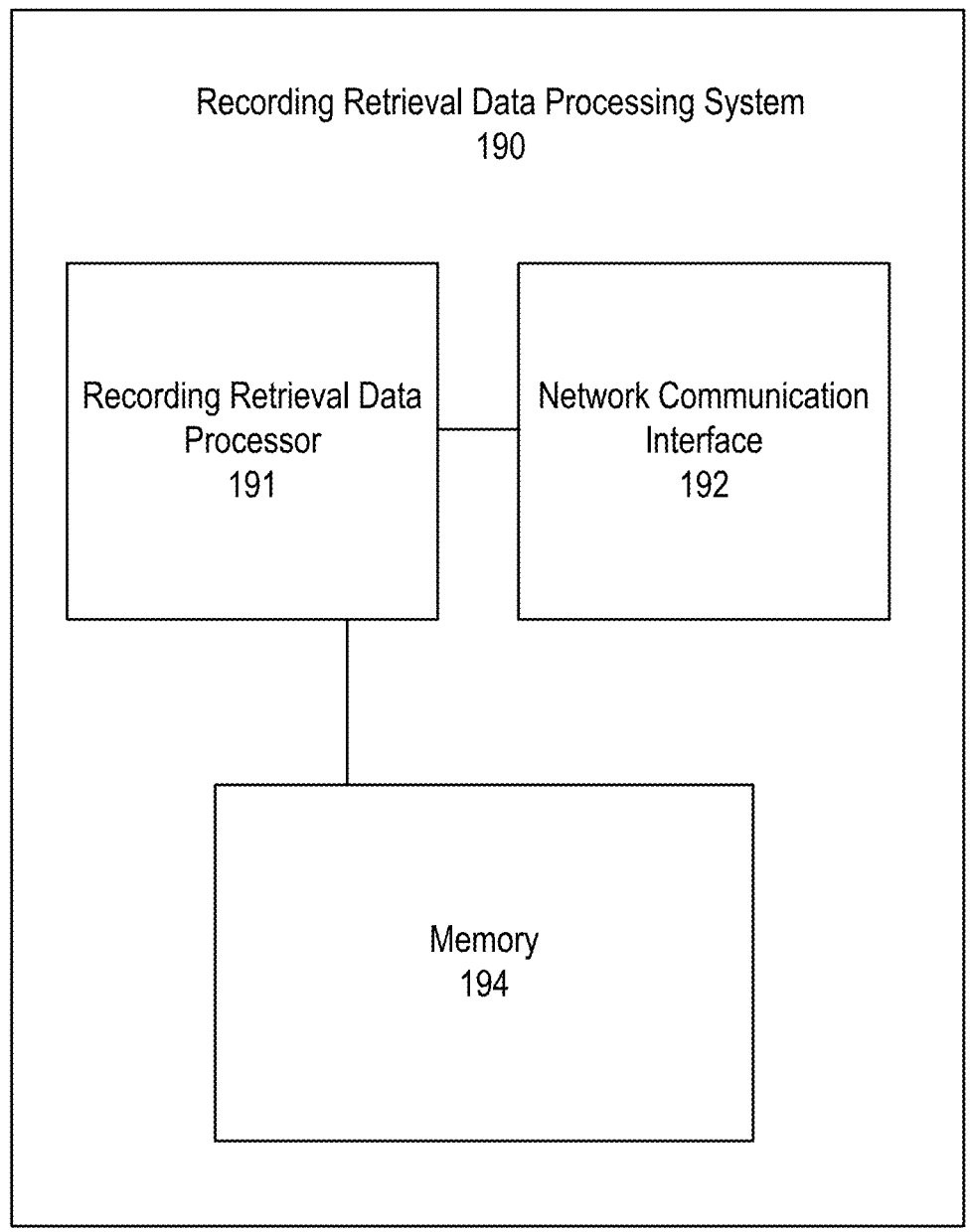
FIG. 7 is a schematic illustration of a recording retrieval data processing system according to an embodiment of the invention.

The recording retrieval data processing system 190 may be or include one or more network-enabled automated data processors configured for communication with each other and with other components of the recordation system 100 via the network 130 or other networks. With reference to FIG. 7, the recording retrieval data processing system 190 may include a network communication interface 192 in communication with a data processor 191. The network communication interface 192 is configured for connection to and communication over the network 130. In particular, the communication interface 192 is configured for communication between the data processor 191 and the incident manager data processing system 110 and external processing systems of management personnel and/or other personnel authorized to view incident resolution information. The network interface 192 can include a network interface card (NIC), Standard Ethernet Version 2 (en), IEEE 802.3 (et), Token-ring (tr), Serial Line Internet Protocol (SLIP), Loopback (lo), FDDI., Serial Optical (so), Point-to-Point Protocol (PPP), or Virtual IP Address (vi). The network interface 192 is configured to communicate with a network. For example, the network interface 192 may communicate with a network to receive and transmit requests for historical incident data.

The recording retrieval data processor 191 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 194 can be a read-only memory, write-once read-multiple memory or read/write memory, e.g., RAM, ROM and EEPROM.

The recording retrieval data processor 191 and memory 194 may be collectively configured to receive requests for recorded information, identify relevant historical incident information and responder dashboard information, and assemble the responsive information for presentation to the requester. In certain embodiments, the data processor 191 may be configured to receive recorded information requests from authorized users that include user-specified criteria for retrieval of recorded incident information. A recording request may include information on the requester and information for verifying authorization of the requester to receive recorded information. Upon verification of authorization, the recording retrieval data processor may evaluate the request criteria. Request criteria could include specification of a particular incident (or incidents) or identification of an incident type or category. It may include specification of a particular target system or system type or category. Request criteria may also include identification of certain responders or responder teams for which dashboard information was recorded and/or a particular action or action category. In addition to recording search criteria, the request may also specify whether the requested recordings are to be retrieved for an entire incident response or for one or more specified time intervals.

The recording retrieval data processor 191 may be configured to identify responder dashboard recordings stored in the incident data storage unit 150 that meet requester criteria. Depending on the criteria, these recordings may be associated with a single or multiple incident response efforts. In typical embodiments, the recorded dashboard information itself will provide the requester with any information needed to identify the incident, the timing of the recording, the status of the target system, and other information the requester may need to analyze the actions and communications of the individual responders and/or responder teams. In some embodiments, however, the recording retrieval data processor 191 may be further configured to determine from the request criteria, additional incident information associated with the dashboard recordings that may be provided to the requester along with the recordings. Such information would be time-synced with the recordings.

The recording retrieval data processor 191 may be further configured to retrieve and assemble the recorded information meeting the request criteria and transmit some or all of it to the requester. In some embodiments, the data processor 191 may be configured to present an index of results meeting the requester's criteria with and to prompt the requester to identify a particular recording for viewing. Upon receiving a selection from the requester, the data processor 191 may transmit a particular recording or recording segment to the requester's processing system for display.

Figure 8:
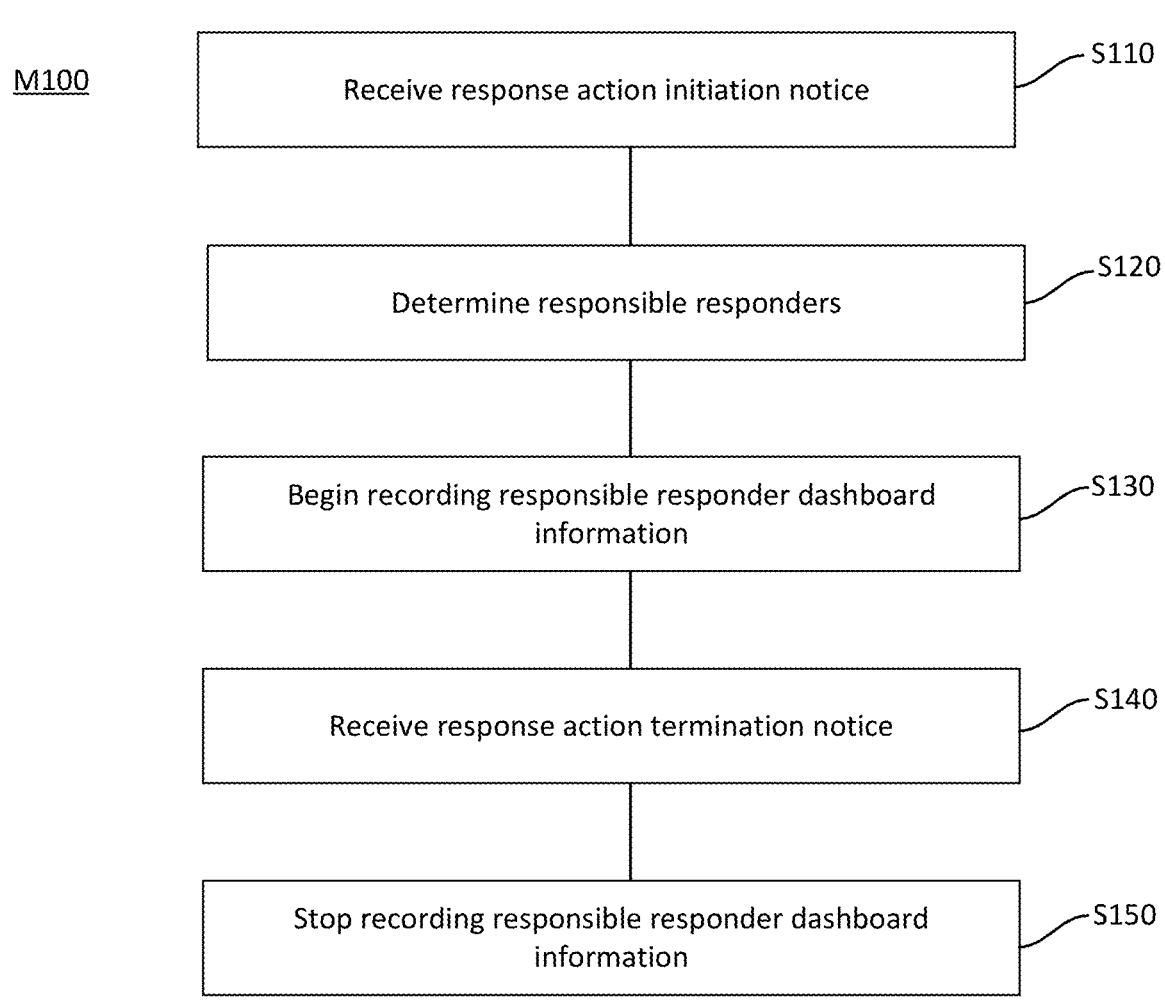
FIG. 8 is a block diagram of an automated method for recordation of incident resolution action information according to an embodiment of the invention.

FIG. 8 is a flow chart illustrating a method M100 according to an example embodiment. While the method M100 may be carried out using the recordation system 100, it will be understood that other systems having a recordation data processing system may also be used. At S110 of the method M100 a response action initiation notification is received by a recordation data processing system. The initiation notification may be received from an incident manager data processor or from an incident resolution system over a network, The action initiation notification may include information identifying and or describing an action taken in furtherance of resolving an incident involving a target processing system. In some embodiments, the notification may include information on responsible responders assigned to the action or a group of responders from which responsible responders may be drawn.

At S120, recordation data processing system determines a set of responsible responders for the initiated action. In typical embodiments, this determination is made using the information included with the initiation notification. In the simplest case, the responsible responders are specifically identified in the notification. In other cases, the recordation system may establish a potentially over-inclusive group of responsible responders based on the notification information. For example, the notification may specify a group or team from which a subset will be selected to work on the action. In this example, the recordation system could set all members of the specified group as responsible responders. In some embodiments, the recordation processing system could request (e.g., from a team leader) identification of the specific team members assigned to the task. In some embodiments, the recordation processing system may make inferences based on historical information regarding the responders likely to be made responsible for an action. This may still be an over-inclusive set, but less so than including an entire group. In particular embodiments, machine learning may be used in combination with historical data to establish a model for making these inferences. The model may use information such as roster information identifying all potential team members, information on whether certain personnel are unavailable (e.g., due to illness, vacation, etc.), and up-to-date information on the skill sets, background, and training of potential responders. It may also use historical information regarding the participation of responders in carrying out similar actions during prior incidents. Feedback may be provided to the model by later identifying the actual responders made responsible for the action.

At S130, the recordation data processing system causes the initiation of a recording of the responder dashboard display for the responder processing system of each responsible responder. In typical embodiments, this may be accomplished by transmitting a recordation initiation instruction to the responder data processing system. The instruction may identify particular information (e.g., display information, communications, video, audio, etc.) that should be included in the recordation or omitted from the recordation. The instruction may also include a time or frequency at which the responder data processing system should transmit recorded information for storage. In response to the instruction that responder data processing system begins recording some or all of the dashboard information presented to or available to the responsible responder along with, if applicable, other recordable data (e.g., voice communications).

At S140 of the method M100 a response action termination indication/instruction is received by the recordation data processing system. This instruction will typically be received from the incident manager data processor or from the incident resolution system as the result of the action having been resolved or the activities of the responsible responders having been otherwise terminated. Upon receiving such a termination instruction, the recordation processor may transmit to each of the responder data processing systems of the responsible responders, instructions to stop recording. In some embodiments, however, the recordation processing system may determine whether any of the responsible responders are also responsible for other ongoing actions. In instances where such is the case, the responder data processing system may withhold the termination instruction so that recordation continues on that responder system. In some particular embodiments, the recordation system may transmit a modification to the recording instructions for such responder systems to reflect the removal of instructions related to the terminated action.

Figure 9:
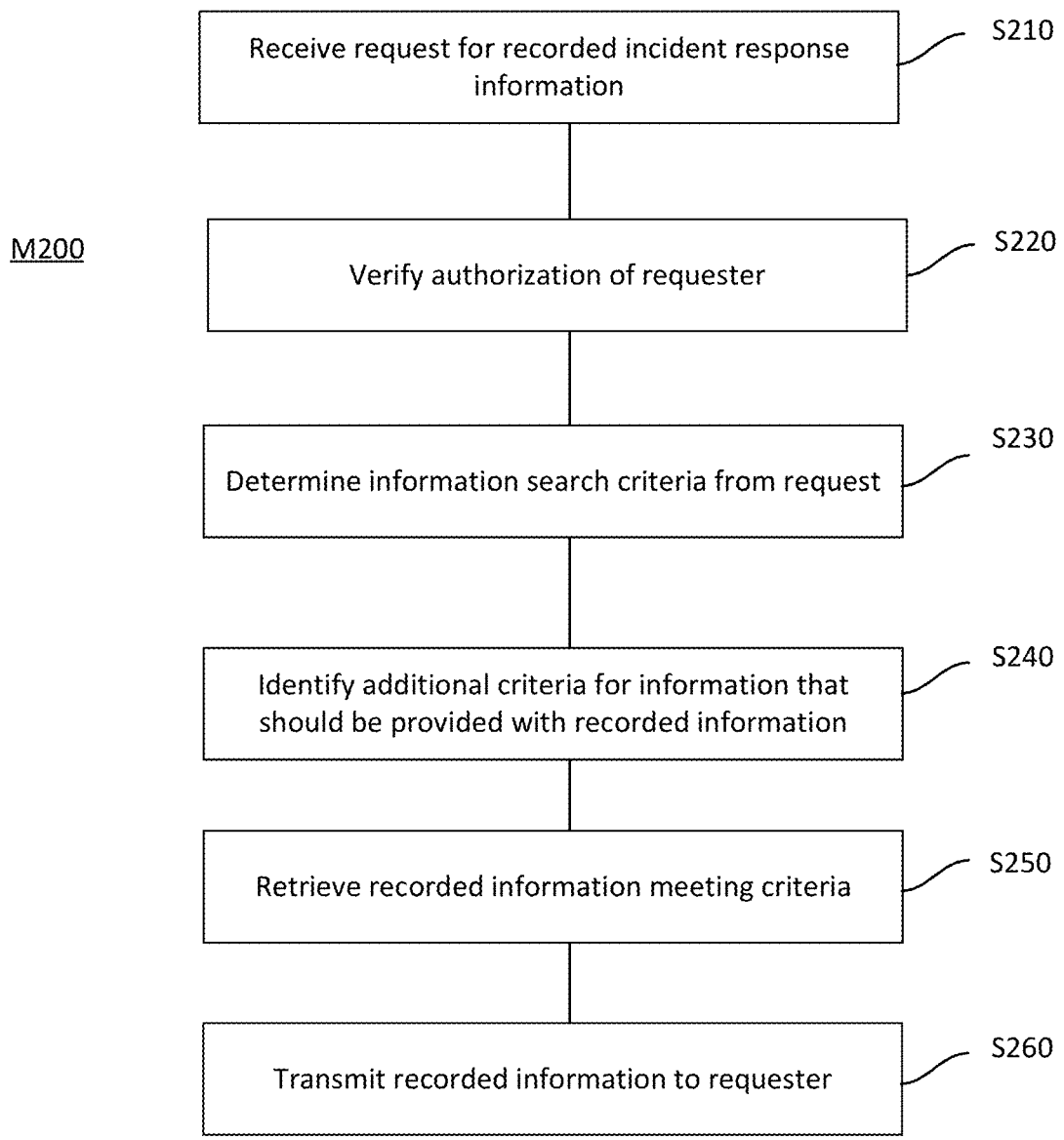
FIG. 9 is a block diagram of an automated method for recordation of incident resolution action information according to an embodiment of the invention.

FIG. 9 is a flow chart illustrating a method M200 for retrieving recorded incident response information from data storage in response to a request from an authorized user according to an example embodiment of the invention. The method M200 may be carried out using a recording retrieval data processing system such as the system 190 of FIG. 7. At S210 of the method M200 a request for recorded incident response information is received by the recording retrieval system. Such a request will typically be received from an incident management data processing system or a data processing system of other users authorized to review such information. In some embodiments, the recording request may include information on the requester and information for verifying authorization of the requester to receive recorded information. The request may also include user-specified criteria for retrieving a desired set of recorded incident information. Request criteria could include specification of a particular incident (or incidents) or identification of an incident type or category. It may include specification of a particular target system or system type or category. Request criteria may also include identification of certain responders or responder teams for which dashboard information was recorded and/or a particular action or action category. In addition to recording search criteria, the request may also specify whether the requested recordings are to be retrieved for an entire incident response or for one or more specified time intervals.

At S220, the recording retrieval system may use the requester information from the request to verify authorization of the requester. This may be accomplished through the use of any suitable primary or primary and secondary verification procedures depending on the embodiment. Upon verification of authorization, the recording retrieval data processor may, at S230, evaluate the information from the request to assemble information search criteria. In some embodiments this may be primarily or exclusively the criteria supplied in the request. In such embodiments, the recorded dashboard information itself may provide the requester with sufficient information to provide context to his/her analysis. In some embodiments, however, the recording retrieval system may establish criteria for additional information to accompany retrieved recordings at S240. Such information—which would be time-synced to retrieved recordings—may be included to provide additional context for the recording reviewer. In some embodiments, the recording retrieval system may use machine learning to determine contextual information criteria.

At S250, the recording retrieval system uses the search criteria to search the data storage unit and retrieve dashboard recordings and other incident response information meeting the criteria. At S260, the system may assemble the retrieved information and transmit some or all of it to the requester for display on the requester's data processing system. In some embodiments, the recording retrieval system may present an index of results meeting the requester's criteria with and prompt the requester to identify a particular recording for viewing. In some embodiments, the system may establish an interactive viewing session that allows the requester to view individual recordings or portions of recordings.

Figure 10:
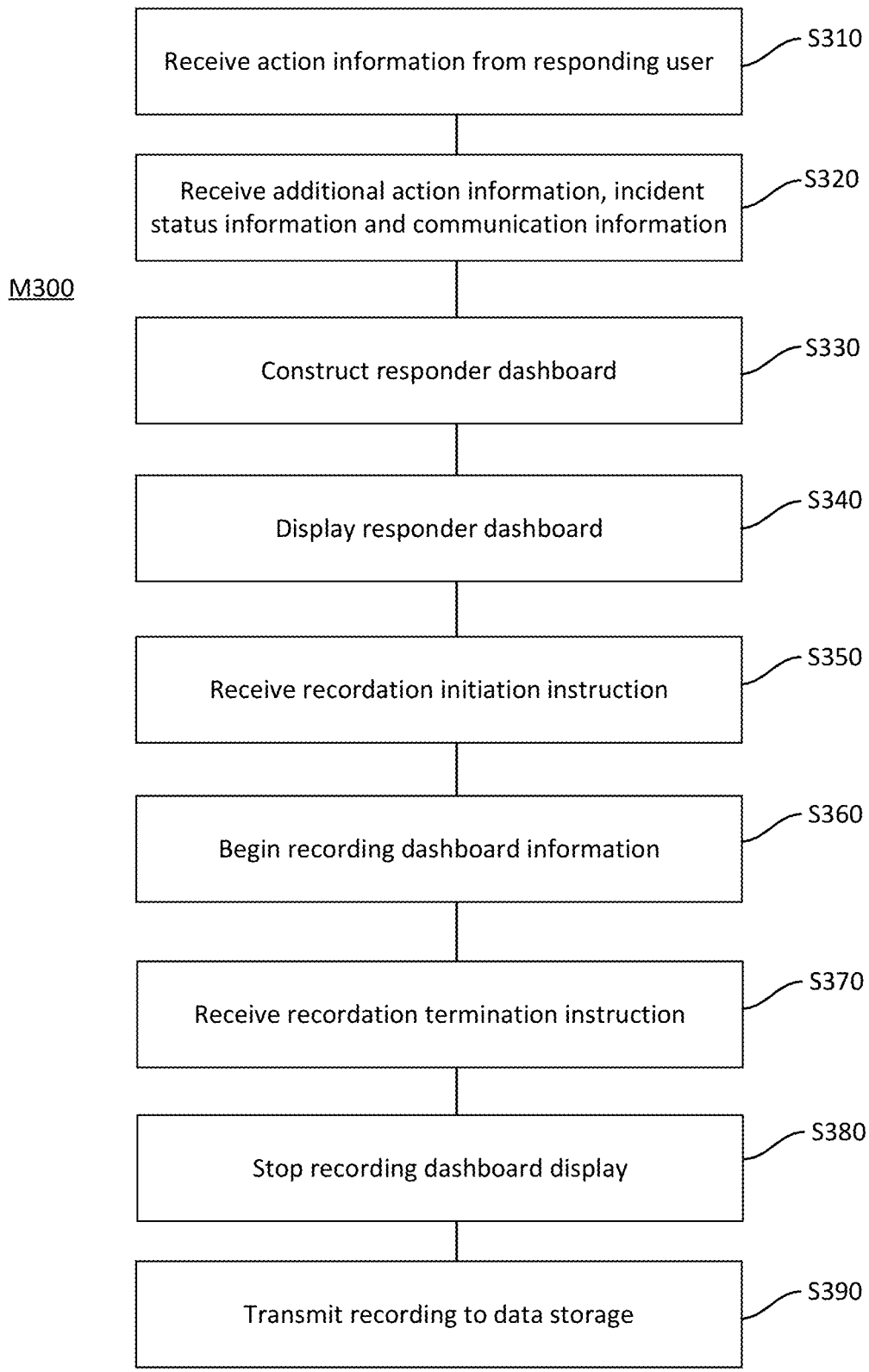
FIG. 10 is a block diagram of an automated method for retrieval of incident resolution action information according to an embodiment of the invention.

FIG. 10 is a flow chart illustrating a method M300 for recording responder dashboard information according to an embodiment of the invention. At S310 of the method M300, a first set of action information may be received by a responder data processor from an associated responder. Such action information may reflect action taken by the responder as part of a larger critical action being implemented in furtherance of resolving an incident on a target system. The first action information may also may be or include a communication of an observation, suggestion, or action result to another responder or an incident manager, At S320, the responder data processor may receive additional information from other responders, the incident manager or automated sources within the incident response system. This may include, without limitation, target system status information, incident status information, and a second set of action information. Some of this information may be in the form of audio or audio-visual telecommunications with other responders and/or the incident manager. Target system information may include information regarding various operating parameters for the system and/or specific parameters associated with the identified failure or performance loss. The information may include current operating parameters and/or past parameters and associated times at specific intervals beginning with the start of the incident.

At S330, the responder data processor assembles available incident information and constructs (and maintains over time) a real-time responder dashboard. Responder dashboard information can include audio communication, visual communication, and/or information otherwise related to on-goming incident resolution efforts, including at least a portion of each of the incident status information, the first and second action information, and response team telecommunication information. At S340, the responder data processor may display some or all of the responder dashboard to the responder via the responder interface. In some embodiments, the particular information displayed at any given time may be selected by the responder.

At S350, the responder data processing system may receive a recordation initiation instruction (typically from an action recordation processing system). This could occur, for example, upon the initiation of an action for which the responder has been deemed a responsible responder in relation to a new critical action. At S360, in response to the recordation initiation instruction, the responder processing system begins recording the time-varying dashboard information. In some embodiments, the recording may include only the dashboard information displayed or otherwise presented to the responder. In other embodiments, the recording may include all of the responder dashboard information. In such embodiments, the recording may indicate which information was actually displayed or otherwise presented to the responder at any given time. In some embodiments, the information to be recorded may be specified in the initiation instruction.

At S370, the responder data processor receives a recordation termination instruction from the action recordation processing system or, in some instances, from the incident manager. This could occur, for example, in response to a determination that an action for which the responder was deemed a responsible responder has been fully resolved. In response to the instruction, the responder data processor stops recording the responder dashboard information. At S390, the responder data processor transmits the recorded dashboard information to a data storage unit along with identification of the responder and/or responder data processor. In some embodiments, this may occur only after termination of recording. In other embodiments, recorded dashboard information may be transmitted periodically or in real-time while recording. In some embodiments, recording segments may be transmitted for storage upon receiving instructions from the responder, the incident manager, or the action recordation processing system.

Embodiments of the present invention provide an efficient, automated mechanism for providing an accessible database of recorded incident response information. The methods of the invention provide for identifying the actual responders carrying out critical actions in furtherance of incident resolution and recording, only for these responders, the incident information available to such responders. The resulting database of incident response recordings is thus limited to a subset of the entire response team and, for each member of the subset, to only those times when they are responsible for carrying out a critical action. This drastically reduces the size of the database and makes possible easy retrieval of information by a post-incident reviewer.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Further, it is to be understood that the terminology used herein is for the purpose of describing particular embodiments only and is not intended to be limiting. The terms "a" or "an" as used herein, are defined as one or more than one. The term "plurality" as used herein, is defined as two or more than two. The term "another" as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper," "lower," "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. The term "funnel axis" should be understood to mean in a direction corresponding to the funnel channel.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

What is claimed is:

1. An automated system for recordation and retrieval of incident resolution action information, the system comprising:
    a recordation data processing system having:
        a recordation system data processor;
        a recordation system network interface in communication with a network; and
        a recordation system memory having stored therein a recordation application configured with instructions for the recordation system data processor to
            receive a response action initiation instruction, the response action initiation instruction including action information identifying a current action taken in furtherance of resolving an incident on a target data processing system,
            determine one or more responsible responders out of a group of responders, each of the group of responders having a responder data processor in communication with one another and an incident response manager processing system over the network, the responder data processor being configured for display of a real-time responder dashboard and for video and audio communication,
            transmit a recordation instruction to the responder data processor of each responsible responder, the recordation instruction including an instruction to begin recording responder dashboard information, the responder dashboard information including at least a portion of the real-time responder dashboard display and video and audio communications of a responder data processing system,
            receive a response action termination instruction identifying the current action, and
            transmit a recordation termination instruction to the responder data processor of each responsible responder, the recordation termination instruction including an instruction to stop recording responder dashboard information; and
    a data storage unit comprising a non-transitory storage medium and configured for receiving, from the responder data processors, real-time responder dashboard information recordings.

2. An automated system according to claim 1 wherein the real-time responder dashboard includes at least one of the set consisting of an incident description, incident time and status information, target system status information, responder action information, and responder communication information.

3. An automated system according to claim 2 wherein the incident time and status information includes a graphical representation of a timeline showing action initiation and resolution times.

4. An automated system according to claim 3 wherein the timeline includes projected future action initiation and resolution times.

5. An automated system according to claim 1 wherein the one or more responsible responders are determined based on information provided in the response action initiation instruction.

6. An automated system according to claim 1 wherein the one or more responsible responders are determined, at least in part, based on status and historical information for each of the group of responders and on historical actions.

7. An automated system according to claim 1 further comprising:
    a recording retrieval data processing system having:
        a retrieval system data processor;
        a retrieval system network interface in communication with a network; and
        a retrieval system memory having stored therein a recordation application configured with instructions for the retrieval system data processor to
            receive, from a requesting processing system over the network, a request for historical incident response information, the request including identification of a requester and incident response information request criteria,
            verify authorization of the requester to receive incident response information,
            retrieve, from the data storage unit, responder dashboard information meeting the incident response information request criteria, and
            transmit the relieved responder dashboard information to a requesting data processing system.

8. An automated system according to claim 7 wherein the incident response information request criteria identifies at least one of the set consisting of
    information relating to actions taken to resolve an incident of a particular type,
    information relating to one or more particular incident resolution action types,
    information relating to incident resolution actions taken by a particular responder, and
    information relating to actions taken by responders of a particular team.

9. An automated system according to claim 7 wherein the responder dashboard information meeting the incident response information request criteria includes a complete recording of real-time responder dashboard display and video and audio communications for at least one particular responder during a time interval of a particular action taken in furtherance of resolution of a previous incident.

10. An automated method for recordation and retrieval of incident resolution action information, the method comprising:
    receiving, by a recordation data processing system over a network, a response action initiation notification from one of the set consisting of an incident response manager data processing system and an automated incident resolution system, the response action initiation notification including action information identifying, a current action taken in furtherance of resolving an incident on a target data processing system;
    determining, by the recordation data processing system, one or more responsible responders out of a group of responders, each of the group of responders having a responder data processor in communication with one another and the incident response manager data processing system over the network, the responder data processor being configured for display of a real-time responder dashboard and for video and audio communication;

transmitting a recordation instruction to the responder data processor of each responsible responder, the recordation instruction including an instruction to begin real-time recording of responder dashboard information and to transmit recorded responder dashboard information to a data storage unit, the responder dashboard information including at least a portion of the real-time responder dashboard display and video and audio communications of a responder data processing system;

receiving a response action termination instruction from one of the set consisting of an incident response manager data processing system and an automated incident resolution system, the response action termination instruction identifying the current action; and transmitting a recordation termination instruction to the responder data processor of each responsible responder, the recordation termination instruction including an instruction to stop real-time recording of the responder dashboard information.

11. An automated method according to claim 10 wherein the real-time responder dashboard includes at least one of the set consisting of an incident description, incident time and status information, target system status information, responder action information, and responder communication information.

12. An automated method according to claim 10 wherein the one or more responsible responders are determined based on information provided in an action initiation instruction.

13. An automated method according to claim 10 wherein the one or more responsible responders are determined, at least in part, based on status and historical information for each of the group of responders and on historical actions.

14. An automated method according to claim 10 further comprising:
receiving, by a recording retrieval data processing system from a requesting processing system over the network, a request for historical incident response information, the request including incident response information criteria,
retrieving, from the data storage unit, responder dashboard information meeting the incident response information criteria, and
transmitting the retrieved responder dashboard information to a requesting data processing system over the network.

15. An automated method according to claim 14 wherein the incident response information criteria identifies at least one of the set consisting of
information relating to actions taken to resolve an incident of a particular type,
information relating to one or more particular incident resolution action types,
information relating to incident resolution actions taken by a particular responder, and
information relating to actions taken by responders of a particular team.

16. An automated method according to claim 14 wherein the action of retrieving responder dashboard information includes
comparing the incident response information criteria to at least one of the set consisting of
incident time and status information included in recorded responder dashboard information displays,
responder action information included in recorded responder dashboard information displays, and
responder identification information in recorded responder dashboard information displays.

17. An automated method according to claim 14 wherein the responder dashboard information meeting the incident response information criteria includes a complete recording of real-time responder dashboard display and video and audio communications for at least one particular responder during a time interval of a particular action taken in furtherance of resolution of a previous incident.

18. An automated system for facilitating incident resolution, the system comprising:
a data storage unit comprising a non-transitory storage medium and having stored therein incident resolution information for a plurality of system incidents;
a plurality of responder data processing systems, each having
a responder data processor,
a network communication interface in communication with a network,
a responder user interface configured for presenting information to and receiving action information from a responding user, and for recording and displaying user telecommunication information, and
a responder memory having stored therein a dashboard application configured with instructions for the responder data processor to
receive incident response information from at least one of the set consisting of the responding user, other responder data processing systems, an incident response management processing system, and an incident resolution data processing system,
construct and continually update a set of responder dashboard information including at least a portion of the received incident response information,
display at least a portion of the responder dashboard information to the responding user via the responder user interface,
receive a recordation instruction to begin recording at least a portion of the responder dashboard information,
receive a recordation termination instruction to stop recording the at least a portion of the responder dashboard information, and
transmit, via the network to the data storage unit, the recorded responder dashboard information; and
an action recordation processing system having
a recordation system data processor,
a recordation system network interface in communication with the network, and
a recordation system memory having stored therein a recordation application configured with instructions for the recordation data processor to
receive action information from at least one of the set consisting of the incident response management processing system and the incident resolution data processing system,
determine whether the action information indicates a critical action is being initiated or has been resolved,
responsive to a determination that the critical action is being initiated,
determine one or more responsible responders associated with the critical action, and
transmit a recordation instruction to the responder data processing system associated with each responsible responder, the recordation instruction including an instruction to begin recording responder dashboard information, and responsive to a determination that the current action has been resolved,
transmit a recordation termination instruction to the responder data processor of each responsible responder, the recordation termination instruction including an instruction to stop recording responder dashboard information.

19. An automated system according to claim 18 further comprising:
a recording retrieval data processing system having:
a retrieval system data processor;
a retrieval system network interface in communication with a network; and
a retrieval system memory having stored therein a recordation application configured with instructions for the retrieval system data processor to
receive, from a requesting processing system over the network, a request for historical incident response information, the request including identification of a requester and incident response information request criteria,
verify authorization of the requester to receive incident response information,
retrieve, from the data storage unit, responder dashboard information meeting the incident response information request criteria, and
transmit the retrieved responder dashboard information to the requesting data processing system.

20. An automated system according to claim 19 wherein the incident response information request criteria identifies at least one of the set consisting of information relating to actions taken to resolve an incident of a particular type, information relating to one or more particular incident resolution action types, information relating to incident resolution actions taken by a particular responder, and information relating to actions taken by responders of a particular team.

* * * * *